United States Patent [19]
Kelly et al.

[11] 3,825,690
[45] July 23, 1974

[54] LOSSLESS NETWORK JUNCTOR FOR PCM DIGITAL SWITCHING SYSTEMS

[75] Inventors: Michael J. Kelly, Melrose Park; Alex W. Kobylar, Chicago; Bernard J. Rekiere, Addison, all of Ill.

[73] Assignee: GTE Automatic Electric Laboratories Incorporated, Northlake, Ill.

[22] Filed: June 1, 1972

[21] Appl. No.: 258,696

[52] U.S. Cl. ......... 179/15 AT, 179/18 J, 179/15 AQ
[51] Int. Cl. ............ H04j 3/00
[58] Field of Search ...... 179/15 AT, 15 AR, 18 GF, 179/15 AL, 15 A, 18 J

[56] References Cited

UNITED STATES PATENTS

| | | | |
|---|---|---|---|
| 3,458,659 | 7/1969 | Sternung | 179/15 AQ |
| 3,597,548 | 8/1971 | Drinnan | 179/15 AT |
| 3,617,643 | 11/1971 | Nordquist | 179/15 AQ |
| 3,632,884 | 1/1972 | Inose | 179/15 AQ |
| 3,660,605 | 5/1972 | Rees | 179/15 AQ |

*Primary Examiner*—Kathleen H. Claffy
*Assistant Examiner*—Thomas D'Amico
*Attorney, Agent, or Firm*—Lester N. Arnold

[57] ABSTRACT

A network junctor for use with a switching network of a PCM digital switching system including two vertical access buses connectible through the functioning of two line switching memory LSM units to any two horizontal group buses of N number of group buses, two data transfer memory DTM units associated with the two access buses, respectively, for receiving, storing and transmitting channel information samples in the form of digital code words, a channel switching memory CSM unit for addressing a selected one of the DTM units to receive and transmit predetermined channel information, and gating means for selectively interconnecting the CSM unit to the selected DTM unit and the DTM units with the two vertical access buses. Each of the five memory units contain channel storage capacities corresponding to the number of time slots per frame capacity of any horizontal group bus.

11 Claims, 9 Drawing Figures

LOSSLESS NETWORK JUNCTOR FOR PCM DIGITAL SWITCHING SYSTEMS

BACKGROND OF THE INVENTION

This invention relates generally to PCM digital switching systems used to switch PCM coded voice signals, and more particularly, relates to a PCM switching system utilizing a network junctor capable of switching fractional coding frame format without signal degradation.

Time division multiplexing TDM and pulse code modulation PCM trnasmission techniques are now being employed quite successfully in the telephone industry for transmitting digitally coded voice signals between different classes of telephone offices over voice-frequency circuits called trunks or highways. In one digital carrier system developed by Bell Telephone Laboratories, Inc. and known as the T1 inter-exchange carrier trunk using D1 channel banks as the terminal equipment, analog voice signals from a number of subscriber lines (channels) are sequentially sampled at a sampling frequency (8,000 Hertz) roughly twice the frequency of the highest voice frequency (4,000 Hertz) expected. The result is a continual pulse stream having pulse amplitudes corresponding to the sampled analog amplitudes. The pulse amplitudes are then coded or quantized to form digital code words which approximate the actual value of the analog amplitude. A code word consisting of seven binary digits would afford 128 ($2^7$) distinct analog values, and an eight bit code word would give 256 ($2^8$) distinct analog values which could be assigned to represent the analog signal.

As commonly understood, the T1 carrier comprises 24 separate channels serially interleaved (multiplexed) with respect to time at the 8 kilohertz sampling frequency so that each channel is read for approximately 5.2 microseconds and a time frame (24 channels) is repeated every 125 microseconds. The seven bit code word is augmented with an eighth bit used as a signaling bit sometimes referred to as a DC supervisory signal for monitoring the on-hook off-hook status of each channel. At the end of every frame period of 125 microseconds, a framing bit used for synchronizing frame position is provided, thus affording a total of 193 bits at a pulse (time slot) repetition rate of approximately 1.544 megabits per second. The seven bit plus signaling bit code word is divided into equal periods of approximately 650 nanoseconds of which the "on time" for a pulse is approximately one-half of this pulse period.

In switching, greater efficiency is gained over this basic time division multiplexing technique by using what is generally known as serial to parallel conversion of the serially presented T1 carrier information. This conversion technique does not form a part of the present invention bt is important in realizing the need met by the Applicant's lossless network junctor. Essentially, 5.2 microseconds of serial information is now made available by the terminal or line equipment in one-eighth of that time, or one pulse period of 650 nanoseconds, leaving the remaining seven time slots (eight bit data format) available for transmitting parallel coded information from other T1 trunk lines. This technique is known as super-multiplexing, e.g., during one time frame parallel coded information can be transmitted for eight different T1 trunk lines for a total channel capacity of 192 channels.

Later generation digital channel banks such as the known D2 of D3 type channel banks utilize a multiplexing technique commonly referred to as fractional coding frame format wherein the signaling or DC supervisory bit can be omitted from five successive time frames and inserted into the sixth time frame without causing appreciable diminishing effect upon the ability of the system to interrogate a particular subscriber station for on-hook off-hook status. The frame format is thus seen to present eight bit coding information for five successive time frames, and then to present seven bit coding information plus a signaling bit for the eighth bit throughout the sixth time frame. This is the fractional coding frame format referred to as 7 5/6 framing format, which has a disadvantage heretofore endured by the PCM digital switching systems without attempts to the best knowledge of the Applicant to compensate for the inherent signal degradation which occurs.

Signal degradation or loss arises, when using D2 or D3 fractional coding frame format, due to the transfer every sixth time frame between eight bit to seven bit coding informational format. In a typical digital switching system, information inputted to a lower order channel will be outputted to a higher order channel with which the lower order channel is interconnected through the control of a call processor unit CPU, which output will be made during the next occurrence of the higher order channel, i.e., within the same time frame. The information inputted to the higher order channel will be transmitted to the lower order channel during its next occurrence in the following time frame. Following this sequence of events, it is apparent that signal loss occurs as a eight bit code word accepted by a higher order channel in the fifth frame is degraded to a seven bit code plus a signaling bit when inserted into the lower order channel in the sixth time frame. Additionally, the seven bit code plus signaling bit accepted by the higher order channel in the sixth frame is misinterpreted as an eight bit informational code word when inserted into the lower order channel of the subsequent frame.

In digital switching systems, it is generally understood that basic switching requirements relate to both space and time switching, i.e., cross-point matrices perform space switching functions and delay memories serve time switching functions. The space switching network can be optimized by providing a high degree of multiplexing consistent with physical size of the switching system and operating speed of the hardware. The number of delay memories utilized can be optimized by locating the memories internal to the space division switching network. This technique is commonly known as hardware concentration as the delay memories are implemented on an expected traffic load basis. For digital switching systems utilizing D2 and D3 channel banks as building blocks, large numbers of channels can be handled such as some 15,360 channels when grouping 80 network inlets, each network inlet comprises eight T1 trunk lines multiplexed by PCM group equipment such as group multiplexers/demultiplexers. If desired, 160 network inlets can be provided to serve some 30,620 channels. Digital switching systems utilizing the D2 format may then have a variety of network inlet pairs ranging from small numbers of such inlet pairs to the larger 160 network inlet pairs. Signal degradation due to fractional coding format exists in each of these size systems and it can be realized that in processing information through a chain of such switching systems as might be done in proceeding through a hierarchy of control switching points, that signal degradation becomes cumulative and highly undesirable.

The delay memories are usually combined with control functions within the network hardware known as junctors. Basically, a junctor has its control function linked to the CPU unit for determining the manner in which the control functions operate. In turn, the control functions determine the operation of particular word memories to store or transmit information in the form of code words, and also to open and close connecting circuit paths at selected crosspoints within the "send" or "receive" space switching network. For example, in a space switching network having N pairs of send and receive buses forming network inlets arranged horizontally, the highway junctors are graphically represented as having vertically arranged send and receive access buses forming connectible crosspoints between the horizontal send and vertical receive buses and the horizontal receive and vertical send buses, respectively. A highway junctor stores originating and terminating partly information until the proper terminating and originating party channels and made available, respectively. Hence, a junctor must have an idle originating time slot in order to receive channel information and must have a terminating time slot available in order to receive terminating channel information. It is thus apparent that where a concentrated type digital switching system is provided, a possible call blocking mode exists when the actual traffic load is greater than the designed traffic load. Another blocking mode exists when a junctor does not have an originating memory slot and at least one terminating memory slot available. Heretofore, network junctors have not provided means for overcoming signal degradation due to the switching of a fractional coding frame format. Another disadvantage has been that only a single path was available for connecting a call through a junctor per send/receive pair of horizontal group buses. Another limitation lies in that previous junctors could handle only one party call during each time slot. A further difficulty with previous junctors has been that originating and terminating trunk lines have had to be assigned to earlier even or odd time slots in order to distinguish between traffic originating and traffic terminating network inlets.

SUMMARY OF THE INVENTION

It is therefore an object of the present invention to provide a lossless network junctor for a PCM digital switching system employing fractional coding frame format.

It is another object of the invention to provide a network junctor having a pair of data transfer memory units for storing two separate calls in any selected time slot of one frame and for reading out the stored information in a call-related time slot of the subsequent frame.

It is still another object of the invention to provide two access buses to the junctor for handling two different calls during each of 192 reoccurring time slots and for providing an additional potential path for connecting a call being processed.

It is a further object to provide a junctor wherein one-way in, one-way out, or two-way trunk lines may be indiscriminately assigned to time slots and network inlets.

In a preferred practice of the invention, a network junctor is provided with A-side and B-side vertical "send" and "receive" access bus lines to be connected respectively, to N number of horizontal "send" and "receive" pairs of group network inlets. A-side and B-side line switching memory LSM units having 192 word memory capacities, respectively, are provided to control the connections at the crosspoints between the A-side and B-side vertical access buses and the N pairs of network inlets. A pair of data transfer memory DTM units are provided, each having 192 word memory capacities and being alternately connectible to the A-side and B-side access fuses. A channel switching memory CSM unit is likewise provided with 192 word memory capacity and is used to connect A-side or B-side time slots of a conversation with the B-side or A-side time slots, respectively, of the same conversation. Gating means are provided to connect the CSM unit with a selected one of the DTM units and to alternately connect the two DTM units with the A-side and B-side access buses. In another practice of the invention, the A-side access bus is connected to N pairs of network inlets and the B-side access bus is connected to M pairs of network inlets.

DETAILED DESCRIPTION

Figures 1, 3:
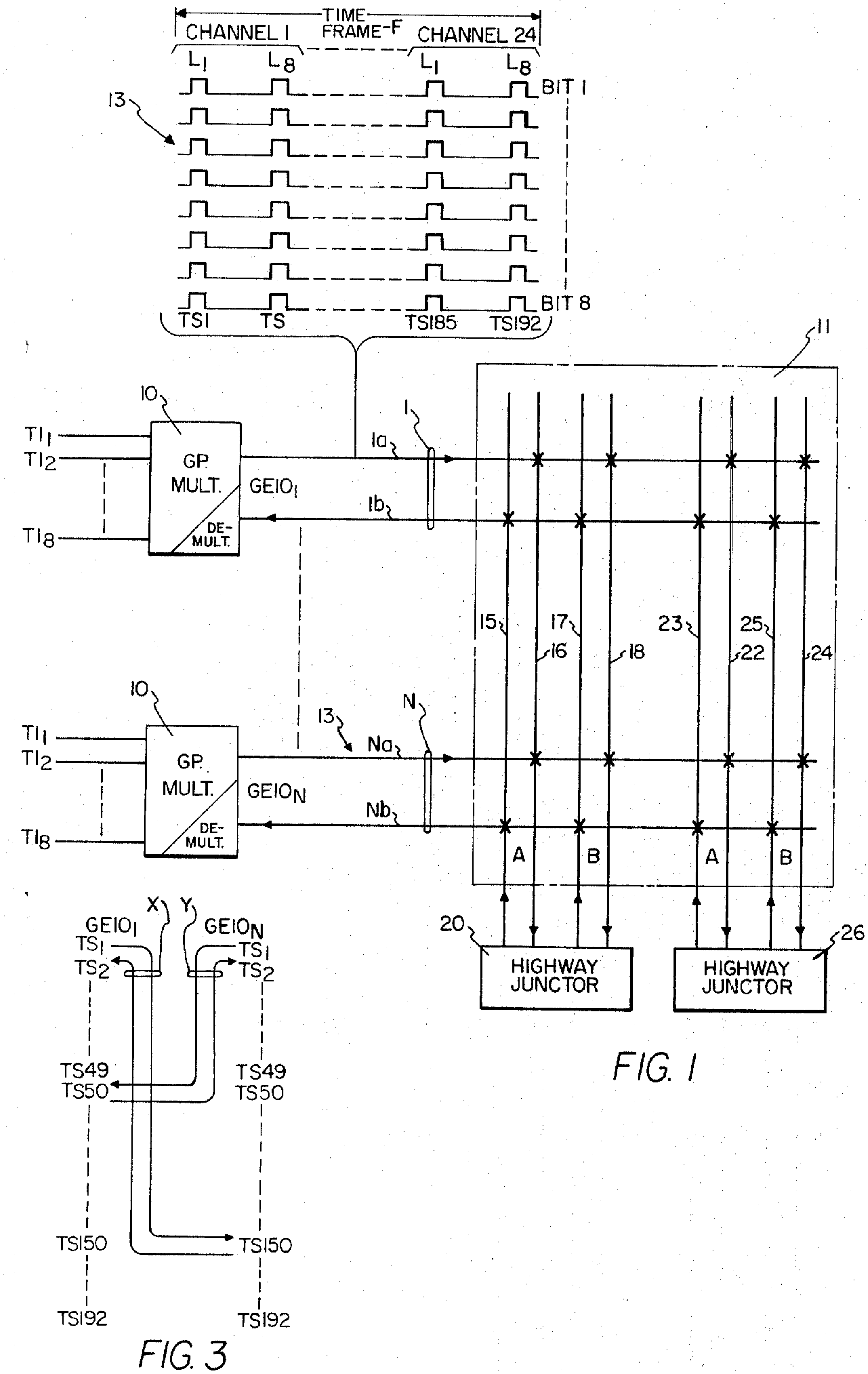
FIG. 1 is a partial block diagram of a TDM/PCM digital switching system showing a grid crosspoing matrix connectible to a highway junctor in accordance with the present invention, which juntor may be selectively connected to the horizontal buses of particular group network inlet pairs.
FIG. 3 is a pictorial representation of a routing pattern of two simultaneously occurring telephone conversations being processed by the highway junctor of FIG. 2.

Now referring to the drawing, FIG. 1 shows a PCM digital switching system of the type contemplated wherein N number of pairs of group network inlets 1-N are provided from group multiplexer/demultiplexer units 10 to the space switching crosspoint matrix indicated at 11. The group units 10 contain the internal components and circuitry necessary in order to multiplex/demultiplex a signal having the frame format shown at 13 which signal is a multiplexed composite of eight separate T1 carrier traunk inputs/outputs shown at $T1_1$, $T1_2$--$T1_8$. The group units 10 at least contain equipment wherein serial to parallel conversion is accomplished on the eight bit informational code words appearing in a fractional coding frame format. The signal format 13 is the same for network inlets 1-N and contains in time slot TS1 of the 24 channel frame an eight bit code word presented in parallel format from the first trunk line $L_1$ or $T1_1$ of the network inlet pair 1. Similarly, time slots TS1 through TS8 contain eight bit parallel code words from the remaining trunk lines through L8 or $T1_8$ of the network inlet pair 1 to complete the information interleaved during channel 1 of the 24 channel frame. Further, this pattern is repeated with channel 24 containing eight bit parallel code words from trunk lines $L_1$ through $L_8$ or $T1_1$ through $T1_8$ of network inlet pair N in time slots TS185 through TS192, respectively.

Each network inlet pair 1-N includes a "receive" transmission line 1*a*-N*a* and a "send" transmission line 1*b*-N*b* which can be connected through crosspoints at each intersection with the receive 16, 18 and send 15, 17 lines, respectively, of the A-side and B-side access buses to a network highway junctor 20. Other possible crosspoints are shown between the receive 22, 24 and send 23, 25 lines of A-side and B-side vertical access buses to another network highway junctor 26. In a typical representation for a crosspoint matrix network such as shown at 11, the group inlet pairs 1-N are shown as horizontal conductors and the A-side and B-side pairs of access buses to highway junctors such as 20 and 26 are shown as vertical conductors.

Figure 2:
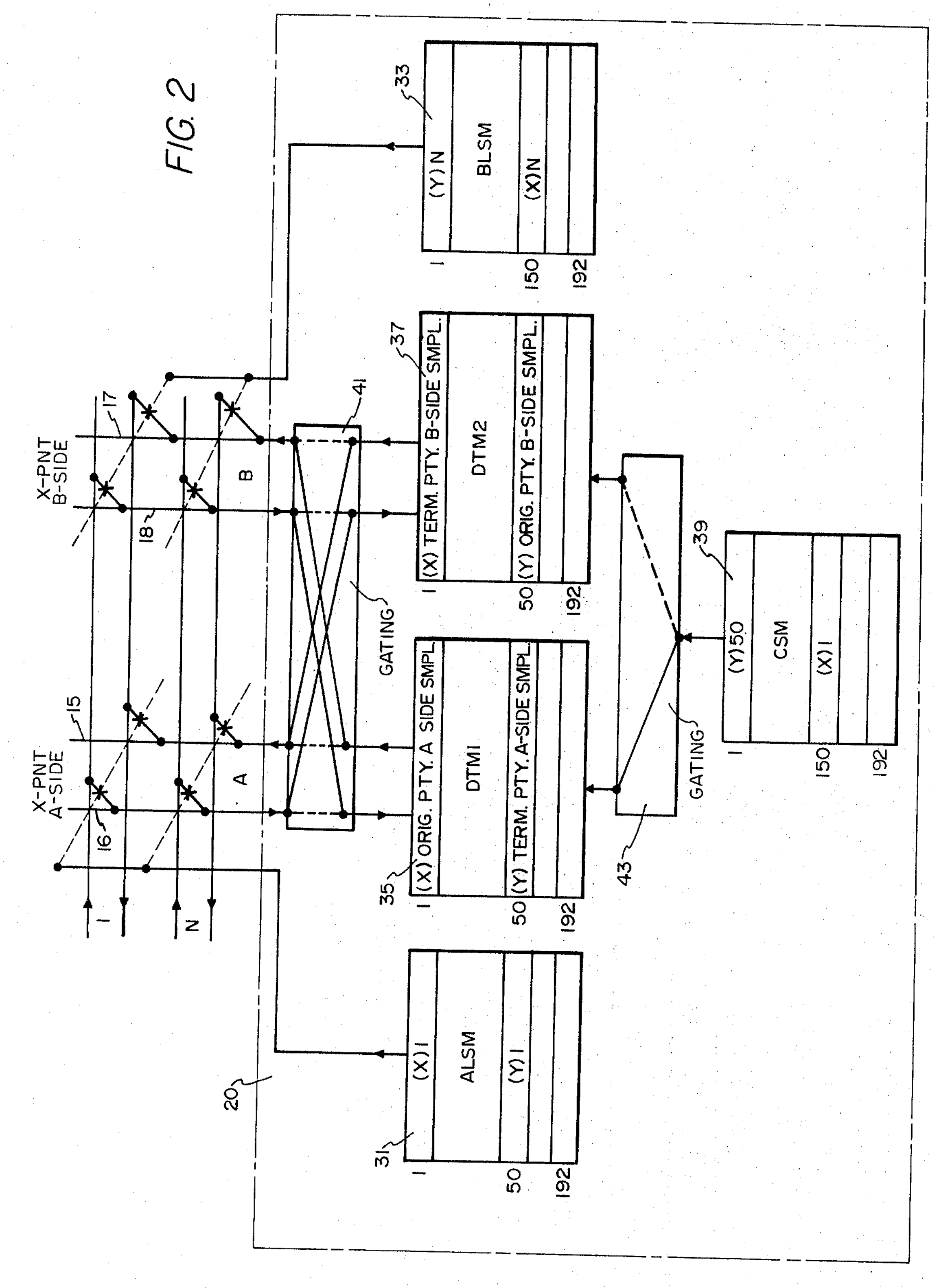
FIG. 2 is a partial block diagram of the highway junctor of FIG. 1.

FIG. 2 shows the details of the highway junctor 20 which is the same as for junctor 26, and therefore, only an explanation of junctor 20 will be given. Nevertheless, it should be understood that the number of junctors provided are greater than the two shown, e.g., when N is equal to 80 network inlets for providing a desired system capacity of some 15,360 channels, it has been determined that an optimum concentration will permit the use of only 32 delay and control memory units (junctors) instead of the 80 (one per inlet pair) as would ordinarily be required without hardware concentration. Also, the number of crosspoints within the matrix 11 is, of course, related to the number of junctors.

For purposes of illustrating the hardware and hardware functioning of the junctor 20, it must necessarily be assumed that at a particular point in time, there are two calls *x* and *y* being switched by the junctor 20. The two calls are pictorially represented in FIG. 3 wherein call *x* is shown by the direction of the arrows to be between an originating party during time slot TS1 of group equipment or unit GE10 serving network inlet pair 1, and a terminating party during time slot TS150 of group equipment 10 serving network inlet pair N, $GE10_N$. Call *y* is shown by the direction of the arrows to be between an originating party during time slot TS1 of group equipment $GE10_N$ and a terminating party during time slot TS50 of group equipment $GE10_1$.

Thus, it is seen that the two calls *x* and *y* are both separated with respect to space and time. Also, the calls are seen to have both originated during the same time slot TS1 and that A-side and B-side information channel samples are being transferred at the same time and may or may not be the same conversation, thus to illustrate some of the several advantages of the unique junctor 20.

The network junctor 20 includes an A-side line switching memory unit (ALSM) 31 and a B-side switching memory unit (BLSM) 33, each having a 192 word memory storage capacity for providing a word storage capacity for each of the 192 time slots of a given frame. The ALSM and BLSM memory units 31 and 33 are used to control the connections of the A-side and B-side network vertical access buses to the group horizontal network buses of the inlet pairs 1-N, respectively. The word lengths for both ALSM and BLSM memory units 31 and 33 must be sufficient to permit the selection of at least one out of N sets of crosspoints between vertical and horizontal buses where N is equal to the total number of network inlet pairs. The junctor 20 includes two data transfer memory units DTM1 and DTM2, indicated at 35 and 37 in FIG. 2, which are conveniently shown as assigned to the A-side and B-side vertical access buses 15, 16 and 17, 18, respectively. The DTM memory units 35 and 37 each have 192 word memory storage capacity for accommodating each of the 192 time slots of a given frame. The word length must be efficient to store the eighth bit code words of the fractional coding frame format. Further, the junctor 20 includes a channel switching memory unit CSM indicated at 39 in FIG. 2 which is used to link a B-side time slot in a conversation with the A-side time slot of the same conversation or vice versa. Again the word memory storage capacity is 192 and the word length is eight bit code words. Means for selectively gating or switching the DTM memory units 35 and 37 between the A-side and B-side vertical access buses is shown functionally at 41 in FIG. 2 and additional gating means is functionally shown at 43 in FIG. 2 for selectively switching the CSM memory unit 39 between the two DTM memory units 35 and 37.

Now assuming that the solid lines of the gating means 41 and 43 are the active connections and the dotted lines are inactive, FIG. 2 shows the calls *x* and *y* in progress at a point where word memory 1 of DTM1 contains a code sample supplied from the originating party of call *x* over the A-side vertical access bus and conveniently referred to as (X) Orig. Pty. A-Side Smpl. Word memory 1 of DTM2 contains an information sample supplied from the terminating party of call *x* over the B-side vertical access bus and conveniently referred to as (X) Term. Pty. B-Side Smp1. Word memories 1 of the ALSM and BLSM units 31 and 33 contain information to close or make the crosspoint connections between the A-side vertical access bus and the send/receive lines of network inlet pair 1 for serving call *x* and the cross-point connections between the B-side vertical access bus and the send/receive lines of the network inlet pair N for serving call *y*, respectively. The CSM unit 39 is shown to be addressing DTM1, and word memory 1 thereof contains the instruction to DTM1 to read out during this particular address, the information stored by word memory 50, namely, the (Y) Term. Pty. A-Side Smpl.

Now, as the digital system clock counts time slot 1, word positions 1 of the memory units ALSM 31, BLSM 33, DTM2 37, CMS 39, and word position 50 of the memory unit DTM1 35 are simultaneously addressed. The crosspoint connections are made between A-side access lines 15 and 16 and network inlet pair 1 as controlled by word position 1 of the ALSM unit 31. The terminating party B-side sample for call *x* is read from word position 1 of the DTM2 and propagated through the gating means 41 to the A-side access line 15 and out to the originating party of call *x* on the send line of the inlet pair 1. Concurrently, an originating party information sample from call *x* is read into word position 1 of the DTM2 via the receive line of the inlet pair 1, A-side access line 16 and gating means 41. With respect to the time slot 1 or system count 1, the first 325 nanoseconds of the 650 nanoseconds total time is used to read out stored information samples and the next 325 nanoseconds is used to store inputted information samples. Now, word position 1 of the DTM2 has been changed to contain (X) Orig. Pty. A-Side Smpl. Simultaneously, the crosspoint connections are made between B-side access lines 17 and 18 and inlet pair N as controlled by word position 1 of the BLSM unit 32. The CSM unit 39 causes the word position 50 of the DTM1 to be addressed and the terminating party A-side sample for call *y* is sent out to the originating party of call *y* via the gating means 41, B-side access line 17 and send line of the inlet pair N. Concurrently, an originating party information sample from call *y* is read into word position 50 of the DTM1 via the receive line of inlet pair N, B-side access line 18 and gating means 41.

Thereafter, the system clock counts time slots TS2 through TS49 with the ALSM and BLSM units 31 and 33 controlling the crosspoint connections in accordance with the stored instructions of their respective numbered word positions. The DTM2 unit 37 transmits and stores information samples for other calls as required by its word positions 2 through 49. The DTM1 unit 35 transmits and stores information samples in accordance with the word position address pattern required by word positions 2 through 49 of the CSM unit 39. As the system clock counts time slot TS50, the ALSM unit 31 again closes crosspoints between the A-side access lines 15 and 16 and inlet pair 1; the word position 50 of the DTM2 unit 37 reads out an originating party B-side sample of call *y* to the terminating party on inlet pair 1 through the A-side send line 15, and stores a terminating party A-side sample of call *y*. Concurrently, the BLSM unit 33 closes the crosspoints between the B-side access lines 17 and 18 and the particular network inlet pair of lines which is being required by the stored information of word position 50, i.e., a call other than *x* or *y*. The CSM unit 39, word position 50 contains stored instructions for the call other than *x* or *y* so that the DTM1 unit 35 can be addressed for information concerning this call which is stored in a known word position.

The system count continues from time slot TS51 through TS149 with the DTM units 35 and 37, ALSM and BLSM units 31 and 33, and the CSM unit 39 behaving in accordance with the above description for calls other than *x* or *y*. During system count TS150, the BLSM unit 33 closes the crosspoints between the B-side access lines 17 and 18 and the inlet pair N because of the information stored within word position 150 of the BLSM unit 33. The CSM unit 39 requires that word position 1 of the DTM1 unit 35 be outputted. Accordingly, an originating party A-side sample of call *x* is sent out over the B-side access line 17 to the terminating party of call *x* over the send line of the inlet pair N. A terminating party B-side sample of call *x* is then brought in over the receive line of inlet pair N and stored in word position 1 of the DTM1. It is apparent that the DTM2 and ALSM memory units are functioning during time slot TS150 but the information thereof is not shown in FIG. 2 as some call other than *x* or *y* is being processed. The system count continues, thusly, through time slot or count TS192 after which a framing bit or supervisory bit is supplied in the time slot TS193.

Now as the system clock counts time slot TS193, the framing bit or interval is reached and the circuitry for gating means 41 and 43 is activated so as to complete internal circuit paths along the dotted lines shown in FIG. 2 rather than the solid lines which were heretofore completed. This new position for the gating means 41 and 43 is effective to connect DTM1 unit 35 with the A-side access bus, the DTM2 unit 37 with the B-side access but and the CSM unit 39 with the DTM2 unit 37. As time slot TS1 is again counted, the ALSM unit 31 connects the A-side access bus to the send and receive lines of network inlet pair 1, and word position 1 of the DTM1 unit 35, namely, a terminating party B-side sample of call *x*, is transmitted to the originating party over the send line of inlet pair 1. Concurrently, an originating party A-side sample of call *x* is read into word position 1 of the DTM1 unit 35. Also during time slot TS1, the BLSM unit 33 connects the B-side access lines to inlet pair N, and word position 50 of the DTM2 unit 37, as determined by word position 1 of the CSM unit 39, is read out to the originating party of call *y* and an originating party B-side sample of call *y* is received for being stored in word position 50 over the inlet pair N. Word position 50 of the DTM2 unit 37 has now changed from (Y) Term. Pty. A-Side Smpl. to (Y) Orig. Pty. B-Side Smpl. according to the abbreviations used in FIG. 2.

As time slot TS50 is counted, the ALSM unit 31 connects inlet pair 1 to the A-side access bus, and the DTM1 unit 35 reads out sample (Y) Orig. Pty. B-Side Smpl. and receives sample (Y) Term. Pty. A-Side Smpl. There is, of course, no change in the status of calls *x* and *y* within the DTM2 unit 37 during TS50. As time slot TS150 is counted, the BLSM unit 33 connects inlet pair N to the B-side access bus and the DTM2 unit 37, under the address control of the CSM unit 39, reads out sample (X) Orig. Pty. A-Side Smpl. and stores sample (X) Term. Pty. B-side Smpl. There is no change in the status of calls *x* and *y* within the DTM1 unit 35 during TS150. The system count continues until the framing interval is reached and the circuit paths through the gating means 41 and 43 are again established along the solid lines shown in FIG. 2. It is now apparent that the initial status of each of the calls *x* and *y* has been reached within the DTM1 and DTM2 units 35 and 37. Through applying the switching sequence as has been set forth for calls *x* and *y*, any other two calls between different group equipments and different time slots can be set up and their switching sequence followed. The adequateness of the detailed description is thought to be sufficiently clear as regards these other calls without unduly lengthening the explanation by setting forth the switching sequence of still other sets of calls.

Figure 4:
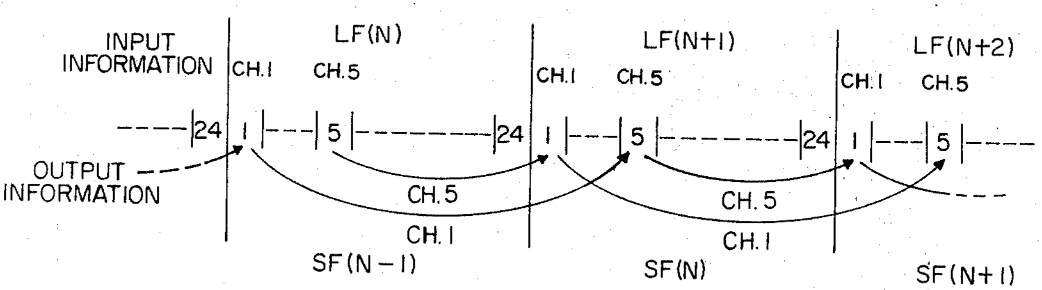
FIG. 4 is a pictorial representation with respect to time of the frame format utilization and information handling capability of the highway junctor of FIG. 2 in processing a single telephone conversation.

It has now been described the manner by which the junctor 20 handles two different calls during each of the 192 reoccurring time slots of each time frame. Also, it has been shown that the time slots indiscriminately handle both originating and terminating trunk lines. Further it has been shown that any particular time slot has a double appearance within the junctor 20 which permits the CPU to first scan for a path in the A to B direction and if network blockage is present, to next scan for a path in the B to A direction. The CPU unit would accomplish this through the following technique, to wit; upon finding the A-side line switching memory to be busy, the B-side line switching memory would be interrogated for busy or idle condition and upon being found idle, the call would be processed through the BLSM unit 33. Likewise, when the BLSM unit 33 is busy, the ALSM unit 31 can be used if idle. Each word of the two LSM memory units 31 and 33 is provided with a busy/idle status bit and the CPU can simultaneously interrogate either the ALSM or the BLSM units for all junctors for selecting an available junctor having an idle line switching unit. It has also been shown that the junctor 20 can store two information samples from a lower order channel (one in each of two adjacent frames) before one of the information samples is read out. This is illustrated in FIG. 4 and is used to accomplish the advantage of overcoming accumulative signal degradation due to time switching of information arranged in the fractional coding frame format. It should be noted that the single restriction in the use of the junctor 20 arises in that for a given call *x* or *y*, if the originating party is being handled by the A-side access bus then the terminating party must be handled by the B-side access bus and vice versa.

FIG. 4 shows a pictorial representation of a single call which might exist between time slot TS1 and time slot TS5. Without the use of the junctor 20, the input information received in frame LF(*N*), which is representative of the inlet frame counter LF in time frame *N*, channel 1 is outputted to channel 5 upon its next occurrence within the same time frame. The input to channel 5 is outputted to channel 1 during its next occurrence in the subsequent time frame LF(*N* + 1). Through the use of the junctor 20, the inputs to both channel 1 and channel 5 during time frame LF(*N*) are outputted within the next occurrence of their connected channels 5 and 1, respectively, during the subsequent time frame LF(*N* + 1). Similarly, input information to channels 1 and 5 during time frame LF(*N* + 1) are outputted to channels 5 and 1, respectively, during time frame LF(*N* + 2). Two input information samples are received in channel 1 during frames LF(N) and LF(*N* + 1) before channel 5 of frame LF(*N* + 1) occurs in which one of the inputs to channel 1 is outputted to the connected network inlet pair of buses. Further, it is required that all network inlets be aligned to the signal or sixth time frame of the fractional coding frame format, and that the inlet frame counter be offset from the system frame counter by + 1 before the D2 line format can be switched without signal degradation. This is illustrated in FIG. 4 by showing the inlet time frame LF(*N*) to correspond to the system time frame SF(N-1) and so on.

However, this particular timing relationship between the inlet time frame LF(*N*) and the system time frame SF(*N*-1) should be understood as being readily accomplished within the frame counter apparatus as might be provided in the channel bank equipment; therefore, it should not be construed as an essential part of the novel apparatus of the highway junctor 20 or 50. However, it is a pre-condition which must exist in order to realize the advantages of the novel highway junctor. Further, it would be well known to those skilled in the art to provide timing apparatus which would achieve the desired delay in framing alignment between the inlet frame counter and the system frame counter. The delay in framing alignment simply constitutes an identification to the system equipment which receives the information from the highway junctor as to which frame now contains the accumulated 7 bit plus signaling or accumulated 8 bit information.

Figure 5:
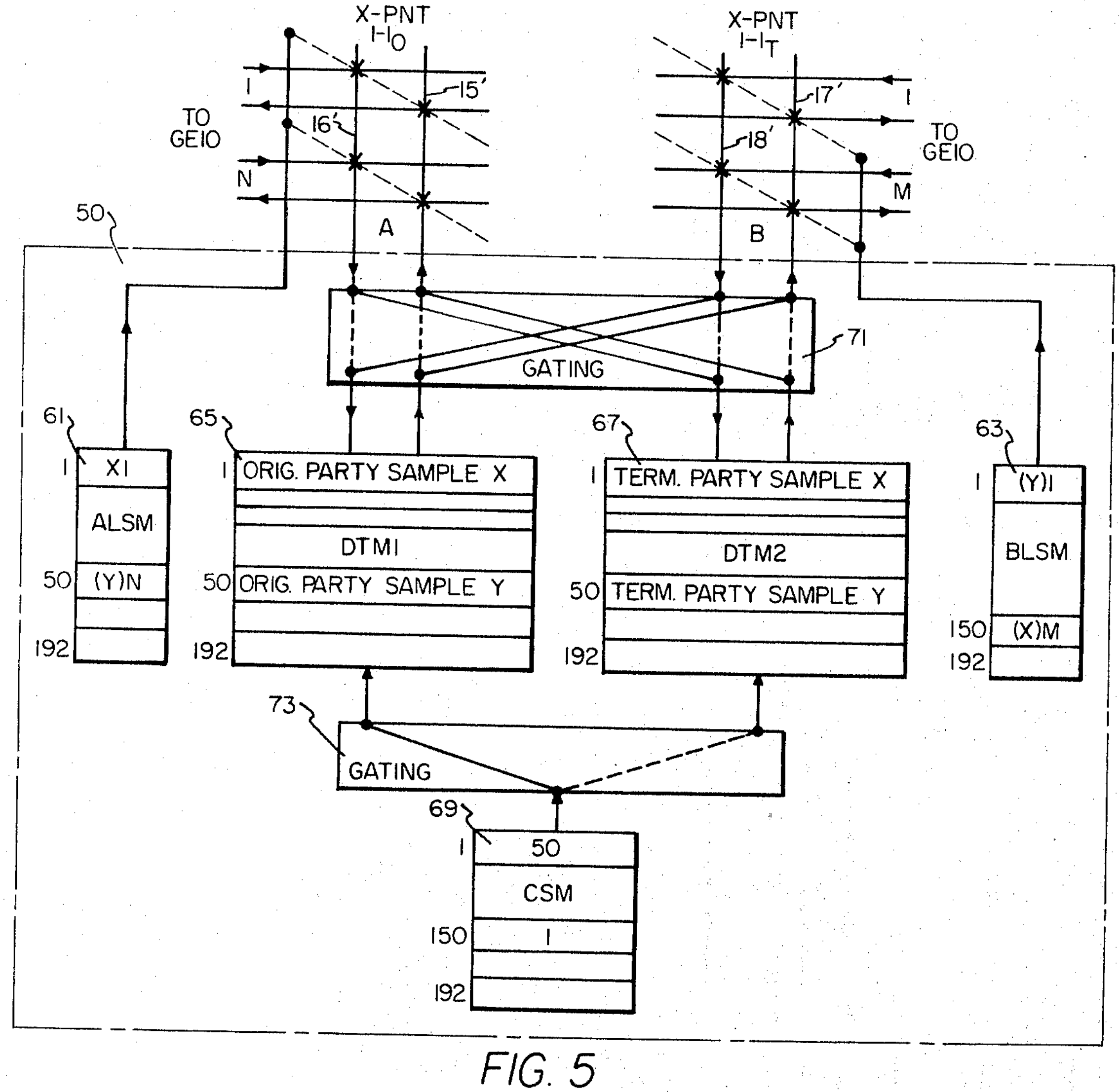
FIG. 5 is a partial block diagram of a highway junctor similar to the highway junctor of FIG. 2 and useful for interconnecting a selected group network inlet pair of N numbers of such group inlets with a selected group network inlet pair of M numbers of such group inlets.

The junctors 20 and 26 have been described with respect to the switching system having a total of N number of group multiplexer/demultiplexer units 10 from which N number of pairs of group network inlets are provided to the switching crosspoint matrix 11. This new highway junctor performs equally as well when used to interconnect the calls originating or terminating from any one of the N number of group units 10 to terminating or originating calls from any one of M number of other group units 10. FIG. 5 shows such a switching system wherein a junctor 50 is used to connect N number of group units 10 through a crosspoint matrix of $1\text{-}I_0$ number of crosspoints to M number of group units 10 through a crosspoint matrix of $1\text{-}I_T$ number of crosspoints. The junctor 50 is of the same type as junctor 20 and includes an ALSM unit 61, a BLSM unit 63, A-side and B-side vertical access bus lines 15', 16' and 17', 18' respectively, a DTM1 unit 65, a DTM2 unit 67, a CSM unit 69 and gating means 71 and 73. The ALSM unit 61, the BLSM unit 63 and the CSM unit 69 are all connected to common control access circuitry (not shown) such as the CPU unit discussed in connection with the switching system shown in FIG. 2. The A-side vertical access bus lines 15', 16' are selectively connectible under the control of the ALSM unit 61 to any network inlet pair 1-N while the B-side vertical access bus lines 17'-18' are selectively connectible under the control of the BLSM unit 63 to any network inlet pair 1-M.

In illustrating the operation of the junctor 50, it is convenient to show two calls *x* and *y* in progress wherein for call *x* an originating party sample is stored in word position 1 of the DTM1 unit 65 and a terminating party sample is stored in word position 1 of the DTM unit 67. For call *y*, the DTM units 65 and 67 containing originating party and terminating party samples, respectively. It can be assumed that the solid line connections through gating means 71 and 73 are active and the dotted lines are inactive during the chosen starting frame. As the system clock counts time slot TS1, the DTM2 unit 67 word position 1 transmits a terminating party sample of call *x* through gating means 71 to the A-side access bus and out on inlet pair 1 of group equipment $GE10_N$. Concurrently, word position 1 of the DTM2 unit 67 receives by the same path through the gating means 71 an originating party sample of call *x* from inlet pair 1 of $GE10_N$. The CSM unit 69 causes the DTM1 unit 65 to read word position 50 during time slot TS1 whereupon an originating party sample of call *y* is transmitted through the gating means 71 and the B-side access bus to inlet pair 1 of group equipment $GE10_M$. Concurrently, a terminating party sample of call $y$ is transmitted from inlet pair 1 of $GE10_M$ into word position 50 of the DTM1 unit 65.

The cyclic counting of the system clock continues until time slot TS50 is reached whereupon the DTM2 unit 67 transmits a terminating party sample of call $y$ through the gating means 71 and A-side access bus to inlet pair N of $GE10_N$, and receives an originating party sample from the same source. The cyclic counting of the system clock continues until time slot TS150 is reached whereupon the CSM unit 69 causes the DTM1 unit 65 to read from word position 1, an originating party sample of call $x$ to the inlet pair M of group equipment $GE10_M$. Concurrently, a terminating party sample of call $x$ is received from inlet pair M of group unit $GE10_M$ into word position 1 of the DTM1 unit 65. Again, cyclic counting of the system clock continues until the framing interval is reached whereupon the gating means 71 and 73 switch to the dotted line connections shown in FIG. 5.

Briefly, within the following time frame during time slot TS1, the DTM1 unit 65 reads out a terminating party sample of call $x$ over the A-side access bus to inlet pair 1 of group unit $GE10_N$ and receives an originating party sample from the same source. Concurrently, the CSM unit 69 addresses word position 50 of the DTM2 unit 67 whereupon an originating party sample of call $y$ is carried over the B-side access bus to the inlet pair 1 of group unit $GE10_M$, and thereupon receives a terminating party sample of call $y$ from the same source. During time slot TS50, the DTM1 unit 65 reads a terminating party sample of call $y$ over the A-side access but to inlet pair N of group equipment $GE10_N$, and at the same time receives an originating party sample from the same source. During the ensuing time slot TS150, the CSM unit 69 addresses the DTM2 unit 67 and reads from word position 1 thereof a terminating party sample of call $x$ over the B-side access bus to inlet pair M of group equipment $GE10_M$, and at the same time receives an originating party sample from the same source. As the system count reaches the framing interval, the gating means 71 and 73 are again activated to the solid line connections shown in FIG. 5 and the previously described sequence of events repeated throughout the duration of the calls $x$ and $y$.

The junctors 20 and 26 are herein defined as local junctors due to their serving only between network inlet pairs 1 through N and the junctors 50 are herein defined as interstage junctors due to their serving to interconnect network inlet pairs 1 through N and network inlet pairs 1 through M. Large traffic capacity digital switching systems can be structured using the building techniques shown in FIG. 6 wherein a number of local junctors 81 serve to time switch calls progressed through cross-point matrix A1, a number of interstage highway junctors 83 serve to interconnect between crosspoint matrix A1 and crosspoint matrix A2, A3, or A4, only the crosspoint matrix A4 being shown in FIG. 6. In the particular digital switching system shown in FIG. 6, the crosspoint matrix A1 serves a total of eighty inlet pairs of group equipment units GE10 while crosspoint matrices A2 through A4 also serve a like number of inlet pairs to comprise a total traffic handling capacity of 4 × 80 × 192 or some 61,440 channel terminations. Both types of junctors, i.e., local junctors 20 and 81 and the interstage junctors 50 and 83, are bidirectional and can handle traffic originating from any given group equipment. Path searching and identification in this larger interstage switching network is fairly simple and can be accomplished as follows: assuming that a path is to be located between time slot TS1 of group inlet pair 1 in matrix A1 and time slot TS150 in group inlet pair 80 in matrix A4, the call processing unit need only read the busy/idle status of the ALSM memory units of the group of interstage junctors 83 between matrices A1 and A4 in time slot TS1; thereafter, the CPU unit reads the busy/idle status of the BLSM memory units in the same group of interstage junctors 83 in TS150 and performs an "AND" function by means of registers to determine if the results of the AND registers are all zeros. If there is at least one interstage junctor 83 in the group of junctors 83 between the two desired crosspoint matrices to be connected, the call can be processed.

Figure 6:
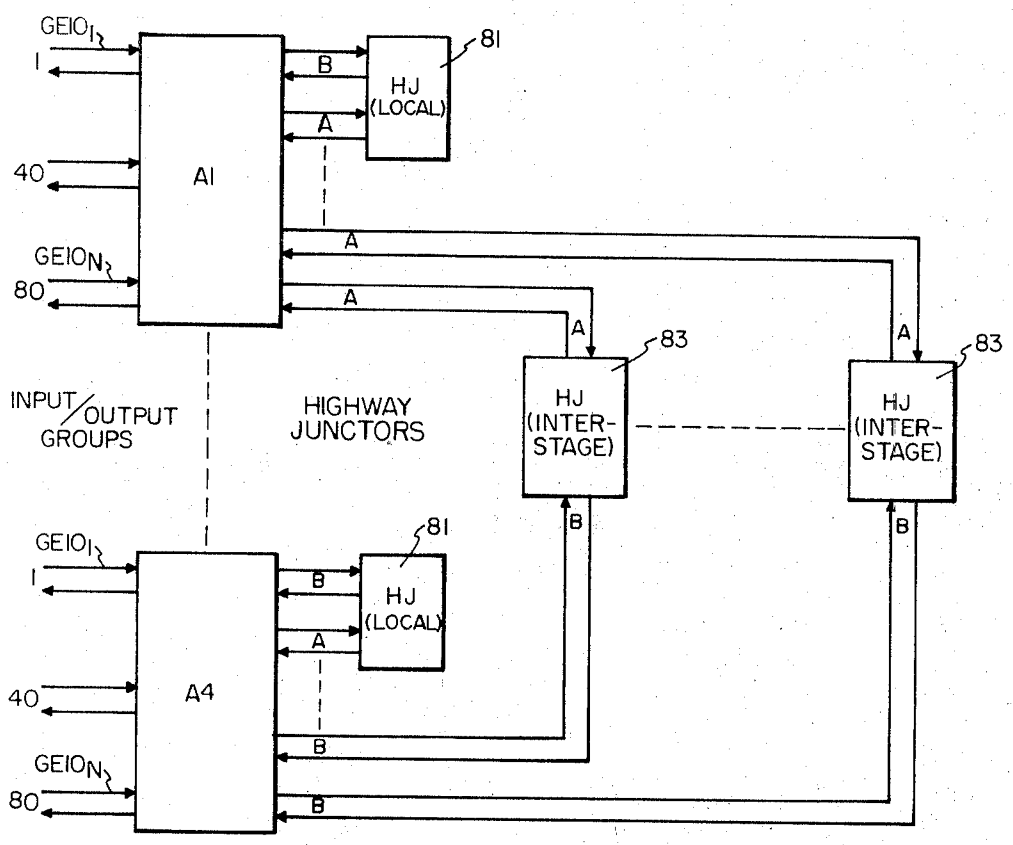
FIG. 6 is a partial block diagram of a multi-stage digital switching system employing the highway junctors of FIG. 2 and FIG. 6 as local and interstage junctors, respectively.

The digital switching system described in connection with FIG. 6 using both the local type junctors 81 and the interstage type junctors 83 is basically a two stage switching system meaning that there are two of the crosspoint matrices A1-A4 used in space-to-space switching of calls existing between group equipments associated with different crosspoint matrices. It is to be pointed out that a completely internal (local) call to a particular crosspoint matrix A1-A4 is space-time-space switched by the crosspoint matrix under the directional control of one of the associated local junctors 81 while an interstage call is space-time-space switched by a pair of the crosspoint matrices A1-A4 under the directional control of one of the associated interstage junctors 83. Of course, the local junctor 81 and the interstage junctor 83 that are used are the ones found to be idle (available) during a busy/idle status search performed by the CPU unit. This two stage switching system is very economical from the considerations of initial cost and maintenance; it is also a relatively uncomplicated system from the standpoint of synchronization and control functions. However, it is obvious tha under fault conditions which disable an interstage junctor 83 or a group of such interstage junctors, a fewer number of network inlets are heavily affected instead of the loss being distributed more evenly over a larger number of the network inlets. This junctor arrangement is designed to provide the total number of interstage junctors on a traffic distribution basis so that with a deviation from the assumed traffic distribution, a diminished grade of service in connecting calls between crosspoint matrices A1-A4 is experienced.

Figure 8:
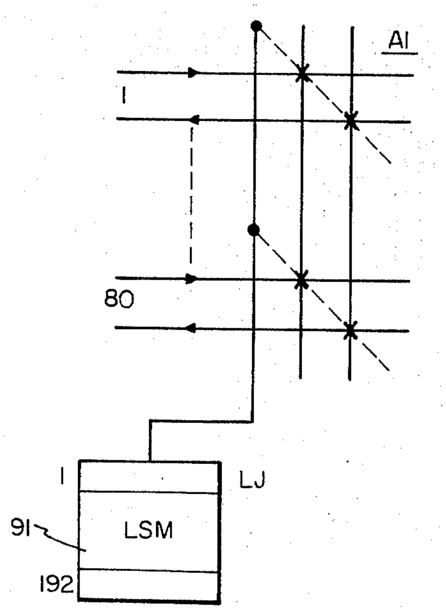
FIG. 8 is a partial block diagram illustrating the use of a single link junctor with a crosspoint matrix network.
Figure 7:
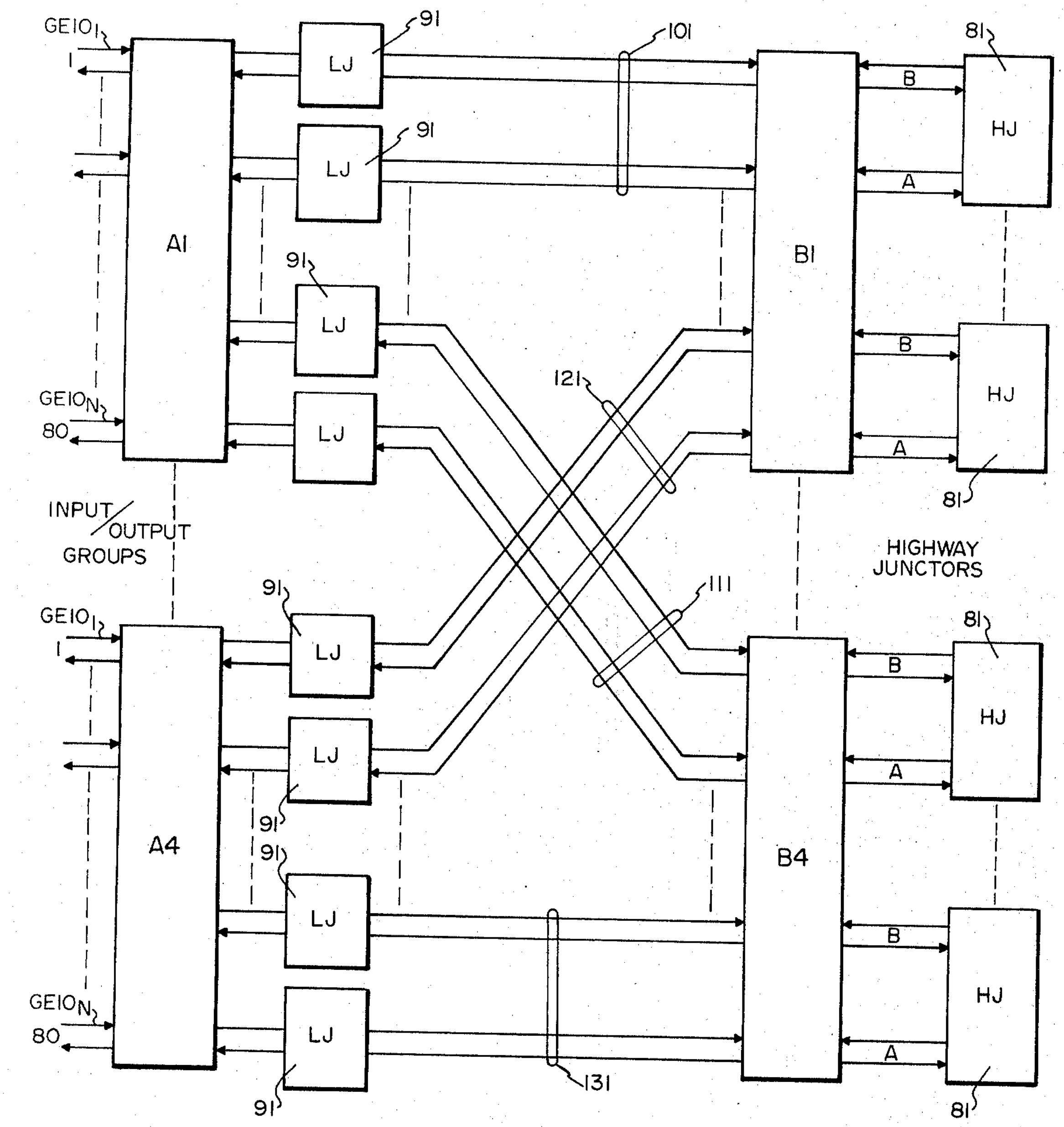
FIG. 7 is a partial block diagram of another multi-stage digital switching system employing only the local type highway junctors of FIG. 2 and further showing a link junctor used for space-space switching.

Another digital switching system is now described in connection with FIG. 7 which uses only the local type junctors 81, that is to say the interstage type junctors 83 are not used; however, an additional space switching junctor 91 called a link junctor is used in addition to the local highway junctor 81. An individual junctor 91 is shown in FIG. 8 and comprises a line switching memory LSM unit performing a space switching function by opening and closing connecting paths through an associated crosspoint matrix. The LSM unit includes 192 word memory storage positions each having the same word bit capacity as the ALSM and BLSM units 31 and 33 of the junctors 20, the link junctor 91 being addressed by common control such as the CPU unit. Now referring to FIG. 7, a set of four crosspoint matrices A1-A4 comprise first level crosspoint matrices, only the matrices A1 and A4 being shown to reduce the complexity of the figure. A second set of four crosspoint matrices B1-B4 comprise second level crosspoint matrices, again only the matrices B1 and B4 being shown to reduce to complexity of the figure. Each of the crosspoint matrices A1-A4 receive N number of network inlet pairs from group equipment $GE10_N$, where N is conveniently chosen as 80. Hence, 4 × 80 × 192 or some 61,440 channel terminations are accommodated as was handled by the system of FIG. 6. Each of the first level matrices A1-A4 are then interconnected by pairs of intermediate buses (hereinafter referred to as intermediate linking pairs) with each of the second level matrices B1-B4, e.g., intermediate linking pairs 101 are shown interconnecting crosspoint matrices A1 and B1 and intermediate linking pairs 111 are shown interconnecting crosspoint matrices A1 and B4. Similarly, intermediate linking pairs 121 and 131 are employed to interconnect first level matrix A4 with second level matrices B1 and B4, respectively. It should be understood that A1 is also connected to B2 and B3 (not shown) and that A4 is connected to B2 and B3. Also, that A2 and A3 (not shown) are interconnected to B1-B4, respectively. The number of intermediate linking pairs interconnecting any given first level crosspoint matrix with any given second level crosspoint matrix is a matter of design choice and is not a part of this application. There is shown in FIG. 7, a link junctor 91 associated with each intermediate linking pair between the first and second level crosspoint matrices. As can be readily understood from FIG. 8, the link junctors 91 are required in order to enable a completed path through the first level crosspoint matrices A1-A4 with which they are associated.

The operation of the local highway junctors 81 with respect to the associated ones of the second level crosspoint matrices B1-B4 is the same as that between junctors 20 and the crosspoint matrix 11 and need not be explained anew. The apparent advantages lie in lessening the effects on the total traffic handling capacity of the system when any one or more of the local junctors 81 or the link junctors 91 are lost through fault conditions. However, the system is more expensive because of the additional crosspoint matrices and the added link junctors. Further the two matrix levels require increased timing control complexity. For example, the CPU unit must now find two idle link junctors 91 as well as two idle local junctors 81 in order to complete a call. This path is located in a similar manner to the manner in which a path was found in the switching system of FIG. 6 except that four registers are required to be summed rather than two.

Figure 9:
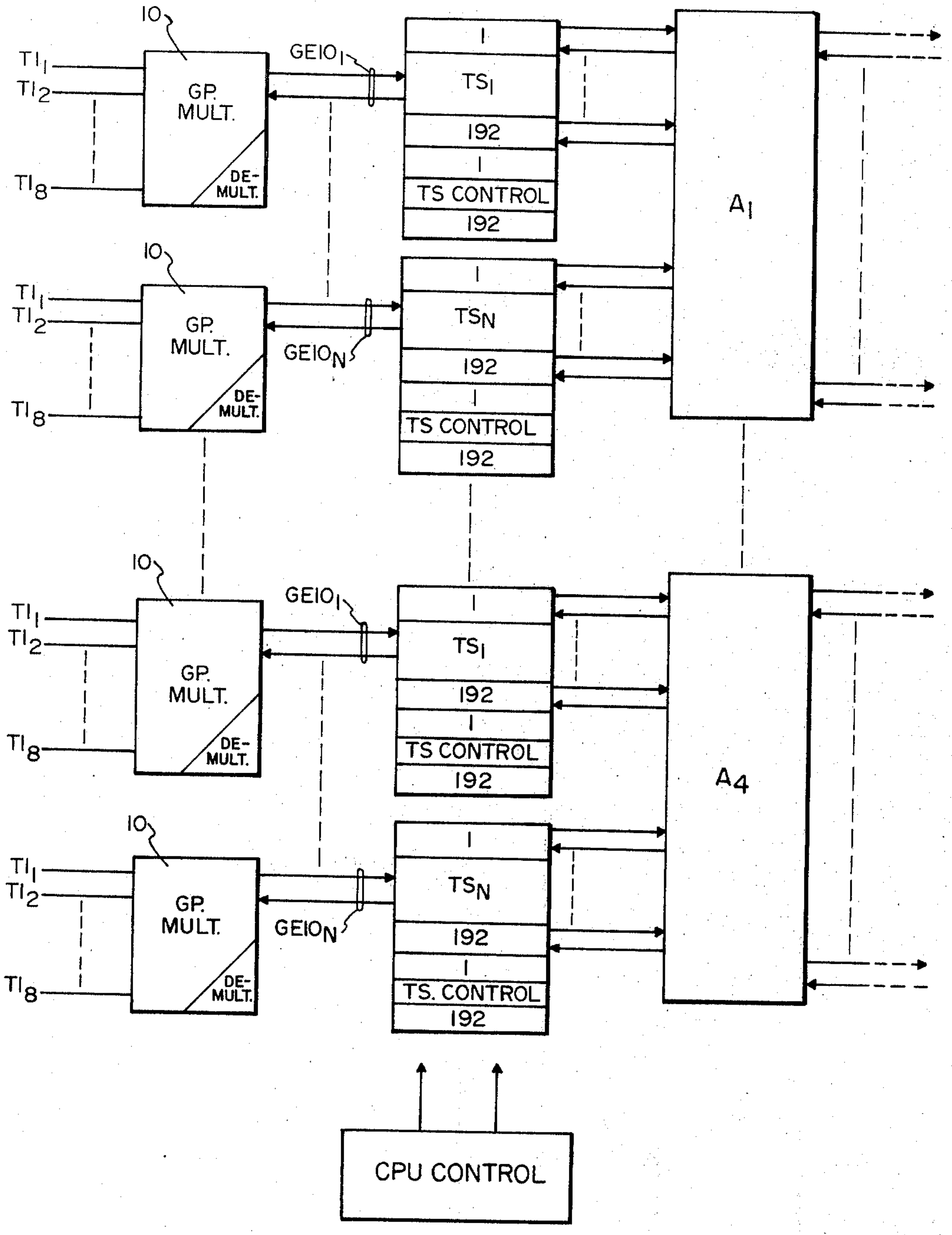
FIG. 9 is a partial block diagram illustrating the use of time switching memory units in a multi-stage digital switching system like those systems shown in FIGS. 6 and 7.

FIG. 9 shows the addition of time switching units or distribution stages TS to the multi-stage switching systems such as discussed above in connection with FIGS. 6 and 7. There is shown in FIG. 9 a plurality of TS switching units such as $TS_1$ through $TS_N$ used with group equipments $GE10_1$ through $GE10_N$, respectively, a number of these group equipments being associated with the crosspoint matrices A1 through A4. Each TS switching unit comprises a plurality of memory stores such as 192 memory stores for storing each of 192 time slots of information, plus a TS control section which determines the sequence of addressing the plurality of memory stores of the TS switching units. The plurality of TS control sections can be alternatively considered as a single common control regulating the addressing of all of the individual TS switching units even though a number of the control sections are functionally shown as a part of the TS switching units. The TS control sections are in turn regulated under the direction of the CPU control unit which is associated with the common control of the total switching system. The purpose of these TS switching units is to provide a time switching function in addition to the time switching function of the highway junctors so that a more efficient use of idle time slots can be obtained through the switching system. This of course is the desired object of an essentially non-blocking communication switching system designed to be independent of traffic distribution.

The word "non-blocking" is usually intended in the telephone trade to connote a switching condition whereby any given call may be processed or connected through a given switching network at any given time without being blocked through the inability of the network to provide an idle connecting transmission path. This is well understood in the art and it will suffice to merely explain the manner in which the TS switching units operate to achieve such results. The overall principle being applied is that incoming informational samples to the switching system will be read cyclically into the TS memory stores or word positions 1 through 192 and thereafter read out on a completely random basis under the direction of the TS control section. Accordingly, the information carried by a given channel need not appear on the group horizontal bus in a fixed position within the time frame format but may then be assigned to any unused channel on the horizontal bus. This technique then permits the achievement of an essentially non-blocking switching system without providing the extra switching equipment which would ordinarily be thought necessary to achieve an essentially non-blocking switching system. Also the TS switching units are shown as interpositioned between the group equipments and the switching matrices but in reality are normally associated within the group equipments.

When these time switching memory stores are combined with the time switching memory stores of the novel local and interstage highway junctors 81 and 83 of the present invention, there is provided a much improved time switching capability whereby an essentially non-blocking switching network can be achieved. For example, in FIG. 9 consider the processing of a call to be completed from time slot 1 of $GE10_1$ of the crosspoint matrix A1 to time slot 1 of $GE10_N$ of the crosspoint matrix A4. An originating information sample from $GE10_1$-A1 is read cyclically into word position 1 of the TS1 switching unit associated therewith. When considering only the equipment of FIG. 9 without the use of the highway junctor 81 or 83, it is apparent that the information from word position 1 of the $TS_1$ switching unit must be connected through the matrices A1 and A4 of the $TS_N$ switching unit that is linked with the A4 matrix. The most direct connection would, of course, be to pass the information through the crosspoint matrices to word position 1 of the $TS_N$ switching unit of $GE10_N$-A4. If this word position is busy, however, the call is blocked without time switching capability.

In a common control switching system, the CPU control unit such as shown in FIG. 9 has previously determined the busy status of the desired word position 1 of the $TS_N$ switching unit of $GE10_N$-A4 and has instructed the TS control unit of $TS_1$-$GE10_1$-A1 that the informational sample of word position 1 be read out during an available idle word position the $TS_N$-GE$10_N$-A4. Now, when the desired word position 1 of $TS_N$-GE$10_N$-A4 is cyclically read by the group equipment GE$10_N$-A4, the associated TS control unit of the $TS_N$-GE$10_N$-A4 instructs the $TS_N$ switching unit to read out of the information stored in the available idle word position that was previously selected by the TS control unit of $TS_1$-GE$10_1$-A1. This example illustrates a flexibility of channel utilization which greatly enhances the time switching capability of the highway junctors 81 and 83. The multi-stage switching system of FIG. 9 is meant to be employed using the combined time switching capability of both the highway junctors 81 and/or 83 and the TS switching and control units.

Now consider such a combined time switching capability for the switching system of FIG. 9. The CPU control unit also determines the sequence of addressing the time slots of the junctors as previously explained. The $TS_1$-GE$10_1$-A1 switching unit read stored information out of word position 1 into an available word position of an associated junctor, which available word position was determined by the CPU unit. The CPU also determines if this first-selected available word position of the junctor is also available in the $TS_N$-GE$10_N$-A4 switching unit. If not, the network junctor can be directed by the CPU unit to have the informational sample that is stored within the first-selected available word position of the junctor now read into a second-selected available word position of the $TS_N$-GE$10_N$-A4 switching unit. Now, during the cyclical reading of the ultimately desired time slot or word position 1 of the $TS_N$-GE$10_N$-A4 switching unit, the associated TS control unit causes the appropriate informational sample to be read from the second-selected available word position within the $TS_N$-GE$10_N$-A4 switching unit to thus complete the call through the switching system of FIG. 9.

It is to be understood that while the present invention has been shown and described with reference to the preferred embodiments thereof, the invention is not limited to the precise forms set forth, and that various modifications and changes may be made therein without departing from the spirit and scope of the present invention.

I claim:

1. In a common control switching network of a pulse code modulated digital switching system particularly useful in switching communication paths between calling and called transmission highways carrying digitally coded informational signals presented in a fractional coding frame format, a network junctor comprising first memory means for simultaneously storing said informational signals from selected paths of said transmission highways during a preselected one of reoccurring divisional time slots of one time frame and transmitting said informational signals to call-related pairs of transmission highways during call-related divisional time slots of an immediately following time frame, second memory means for storing common control instructions and controlling in a predetermined sequence in accordance with said instructions the connections of said first memory means with said selected pairs and with said call-related pairs of transmission highways, and third memory means for storing other common control instructions for causing said first memory means to store and transmit said informational signals in said predetermined sequence, said first memory means being connectible to said selected pairs and to said call-related pairs of transmission highways through at least two pairs of access lines, said first memory means including a pair of memory devices and each memory device being alternately connectible to said two pairs of access lines during two adjacent time frames, respectively, for both storing and transmitting said informational signals from said selected pairs of the transmission highways during one time frame and both storing and transmitting said informational signals from said call-related trnasmission highways during said immediately following time frame.

2. A network junctor as claimed in claim 1 wherein said second memory means comprises at least two memory devices for providing a second-type memory device in association with each of said two access line pairs, one of said second memory devices selectively connecting its associated pair of said two pairs of access lines with said selected pairs of transmission highways and the other of said second memory devices selectively connecting its associated pair of said two pairs of access lines with said call-related pairs of transmission highways.

3. A combined space and time switching system for completing communication paths along transmission highways having pairs of originating and terminating trunk lines carrying time division digital informational signals, said switching system comprising (*a*) *x* number of pairs of access lines connectible to said pairs of trunk lines for carrying said informational signals, and (*a*) *x*/2 number of switching junctors, each of said junctors connected to at least two pair of said access lines and including a pair of data transfer memory devices having a plurality of memory stores and being connected to said two pairs of access lines alternately in adjacent time frames for selectively receiving from and transferring thereto said informational signals, *x* number of line switching memory devices, each thereof having a plurality of memory stores and each selectively activating the connection of selected pairs of said trunk lines to an associated pair of said two pairs of access lines, *x*/2 number of channel switching memory devices, each having a plurality of memory stores which selectively address in alternate time frames the memory stores of alternate ones of said data transfer memory devices, said memory stores for said data transfer memory devices. said line switching memory devices and said channel switching memory devices all being at least equal to the number of distinct informational signals presented within a single time frame.

4. A switching system as claimed in claim 3 wherein some of said originating and terminating trunk lines comprise communication paths for one associated set of transmission highways and others of said originating and terminating trunk lines comprise communication paths for another associated set of transmission highways, and one of said line switching memory devices is used to connect one of said associated pair of access lines to selected pairs of trunk lines of said one set of transmission highways and the other said line switching memory devices is used to connect the other of said associated pair of access lines to selected pairs of trunk lines of said other set of transmission highways.

5. A switching system as claimed in claim 3 wherein said digital informational signals are arranged in a repeating time frame format and during any single time frame of said format, one of said data transfer memory devices is connected to one pair of said two pairs of access lines and the other of said data transfer memories is connected to the other pair of said two pairs of access lines, and during an immediately following time frame, said one data transfer memory device is connected to said other pair of access lines and said other data transfer memory device is connected to said one pair of access lines for transferring information received over one pair of access lines during one time frame to the other pair of access lines during the subsequent time frame.

6. A switching system as claimed in claim 5 wherein during any two adjacent time frames of said repeating time frame format, said channel switching memory device is connected during the entire first time frame to one of of said data transfer memory devices and during the entire second time frame is connected to the other of said data transfer memory devices for selectively addressing the memory stores of said two data transfer memory devices in separate time frames.

7. A switching system as claimed in claim 6 wherein said single time frame is comprised of a plurality of time slots within which to provide voice informational samples, said time slots corresponding in number to the plurality of memory stores for each of said two data transfer memory devices for providing the storage of two separate informational signals and the transmittal of two separate informational signals in a selected single time slot of said single time frame.

8. A switching system as claimed in claim 7 wherein some of said trunk lines comprise a first set of trunk lines and others of said trunk lines comprise a second set of trunk lines, a first time slot of a single time frame communicated over a predetermined one of said trunk lines of said first set thereof has a correspondingly numbered memory store in each of said data transfer memory devices, a selected one of said two memory stores receiving said informational sample from said first time slot, a second time slot of a single time frame communicated over a predetermined one of said trunk lines of said second set thereof has a correspondingly numbered memory store in each of said data transfer memory devices, a selected one of said two memory stores receiving said informational sample from said second time slot, and when said informational sample within said first time slot of said one trunk line of said first set thereof is to be inputted to said second time slot of said one trunk line of said second set thereof and vice versa, said correspondingly numbered memory stores in each of said data transfer memory devices provide a first selectable communications path through said junctor extending from said one access line pair to said other access line pair and a second selectable communications path through said junctor extending from said other access line pair to said one access line pair whereby there is provided two potential communication paths through said junctor for each time slot of each time frame.

9. A switching system as claimed in claim 8 wherein when said selected one of said two memory stores which receives said informational sample from said first time slot is within one data transfer memory device, the selected one of said two memory stores which receives said informational sample from said second time slot is within the other data transfer memory device.

10. In a time division multiplexing pulse code modulating communication system having a number of group multiplexer/demultiplexer units for providing digital informational signals arranged in a repeating time frame format, a combination space and time switching system comprising a number of pairs of originating and terminating trunk lines for carrying said informational signals and being connectible to said group units, respectively, at least two other pair of originating and terminating trunk lines for carrying said informational signals and being connectible to said first-mentioned pairs of trunk lines to define a grid-like crosspoint matrix arrangement, and at least one switching junctor including a pair of data transfer memory devices, each having a plurality of memory stores and being alternately connected in successive time frames to said first-mentioned pairs and said other pairs of trunk lines for both receiving said informational signals from and transferring said informational signals thereto, respectively, a pair of line switching memory devices each having a plurality of memory stores and selectively connecting an associated one of said data transfer memory devices with selected ones of said first-mentioned pairs and said other pairs of trunk lines at the crosspoints of said matrix arrangement, a channel switching memory device having a plurality of memory stores, said channel switching memory device alternately addressing the memory stores of said data transfer memory devices within successive time frames of said repeating time frame format, said memory stores for said data transfer memory devices, said line switching memory devices and said channel switching memory device all being at least to the number of distinct informational signals presented within one time frame of said repeating time frame format.

11. In a common control switching network of a pulse code modulated digital switching system particularly useful in switching communication paths between calling and called transmission highways carrying digitally coded information signals presented in a fractional coding frame format of reoccurring divisional time slots arranged in repeating time frames, a network junctor comprising first and second memory means including, respectively, a plurality of separate memory stores equal in number to twice the number of informational time slots of a single time frame and provided as first and second groupings of memory stores, each grouping thereof equal in number to the number of time slots of a single time frame, said first grouping of said first memory means being connectible during a predetermined time slot of a selected time frame to a calling and a called transmission highway for simultaneously storing said informational signals carried thereon and further being connectible to call-related called and calling transmission highways, respectively, during a call-related time slot of an immediately subsequently occurring time frame for simultaneously transmitting said stored signals thereto, said second grouping of said first memory means being connectible during said predetermined time slot of said selected time frame to said call-related called and calling highways for simultaneously storing said transmitted signals carried thereon and further being connectible to said calling and called highways during said call-related time slot of said subsequently occurring time frame for simultaneously transmitting said stored signals thereto, said first and second groupings of said second memory means having memory stores corresponding to said selected memory stores of said first and second groupings of said first memory means, respectively, said corresponding memory stores sotring therein common control instructions relating to the connection patterns of said selected memory stores and alternately activating in accordance with said instructions the connections of said first and second groupings of said first memory means to said calling and called highways and to said call-related called and calling highways, respectively, and third memory means having a plurality of memory stores equal in number to the number of separate signals of a time frame, selected ones of said memory stores being associated with said selected memory stores of said first and second groupings of said first memory means and containing therein stored common control instructions providing for the read out of said selected memory stores of said first and second groupings of said first memory means alternately in successive time frames.

* * * * *

UNITED STATES PATENT OFFICE

CERTIFICATE OF CORRECTION

Patent No. 3,825,690 Dated July 23, 1974

Inventor(s) M.J. Kelly/A.W. Kobylar/Bernard J. Rekiere

It is certified that error appears in the above-identified patent and that said Letters Patent are hereby corrected as shown below:

Col. 16, line 43 --(a)--should be inserted before "x/2"

Col. 18, line 37 -- equal -- should be inserted before "to"

Col. 19, line 8 "sotring" should be -- storing --

Signed and sealed this 3rd day of December 1974.

(SEAL)
Attest:

McCOY M. GIBSON JR.
Attesting Officer

C. MARSHALL DANN
Commissioner of Patents